No. 725,065. PATENTED APR. 14, 1903.
P. R. FRANKE.
MACHINE FOR MAKING PRALINES.
APPLICATION FILED DEC. 29, 1902.
NO MODEL. 3 SHEETS—SHEET 1.

WITNESSES. INVENTOR.
Albert Jones. Paul Robert Franke
Samuel Percival. By his Attorneys.
Wheatley & MacKenzie

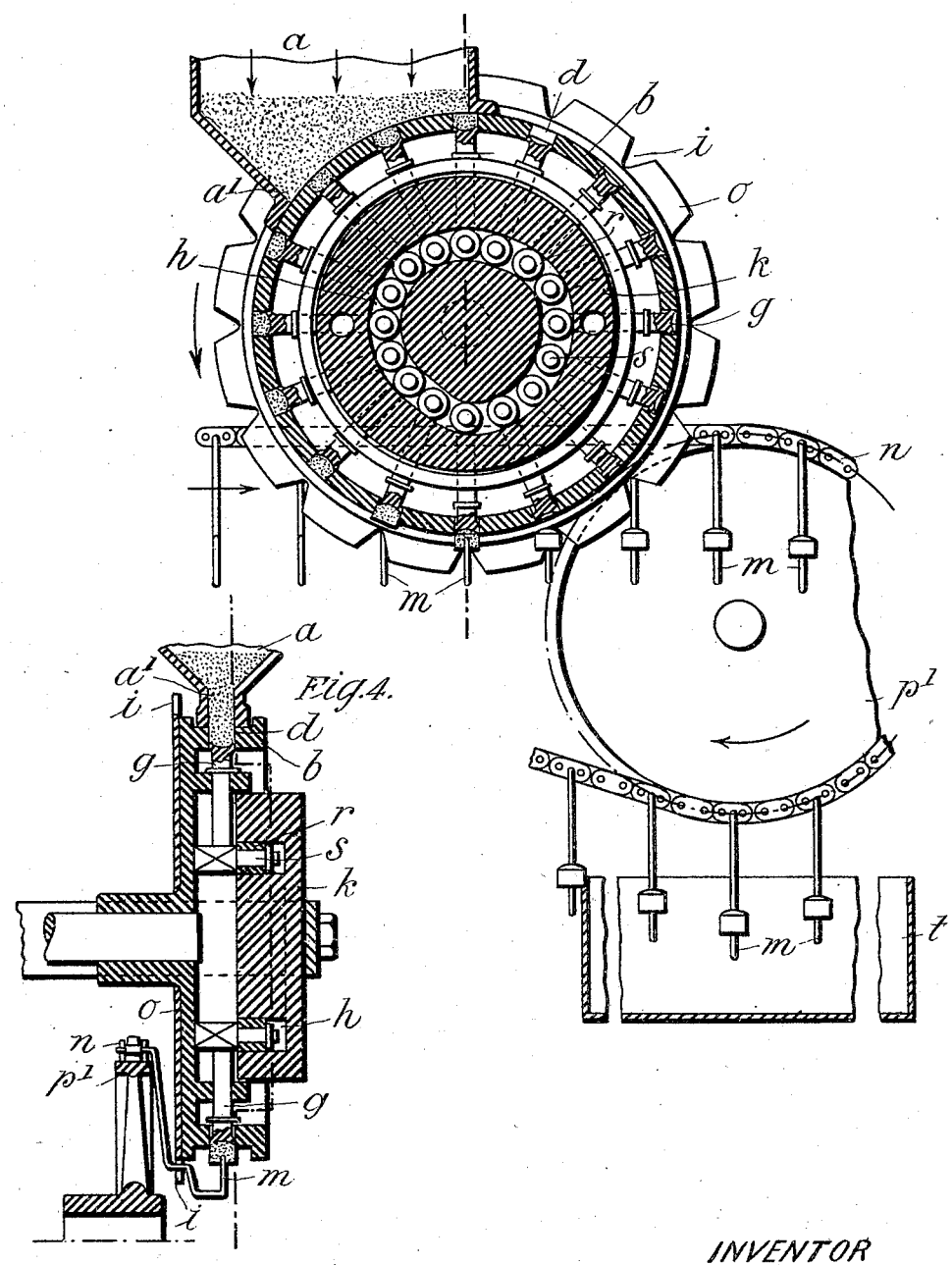

UNITED STATES PATENT OFFICE.

PAUL ROBERT FRANKE, OF LEIPZIG, GERMANY.

MACHINE FOR MAKING PRALINES.

SPECIFICATION forming part of Letters Patent No. 725,065, dated April 14, 1903.

Application filed December 29, 1902. Serial No. 137,050. (No model.)

*To all whom it may concern:*

Be it known that I, PAUL ROBERT FRANKE, a subject of the Emperor of Germany, residing at 1 Markranstädterstrasse, Leipzig-Plagwitz, Germany, have invented certain new and useful Improvements in Machines for Making Pralines; and I do hereby declare the following to be a full, clear, and exact description of the invention, such as will enable others skilled in the art to which it appertains to make and use the same.

The object of this invention is to simplify the making of pralines by connecting the core-molding machine with a suitable steeping device, so that the molding of the core and its subsequent immersion may be effected mechanically in a homogeneous working operation.

Figure 1:
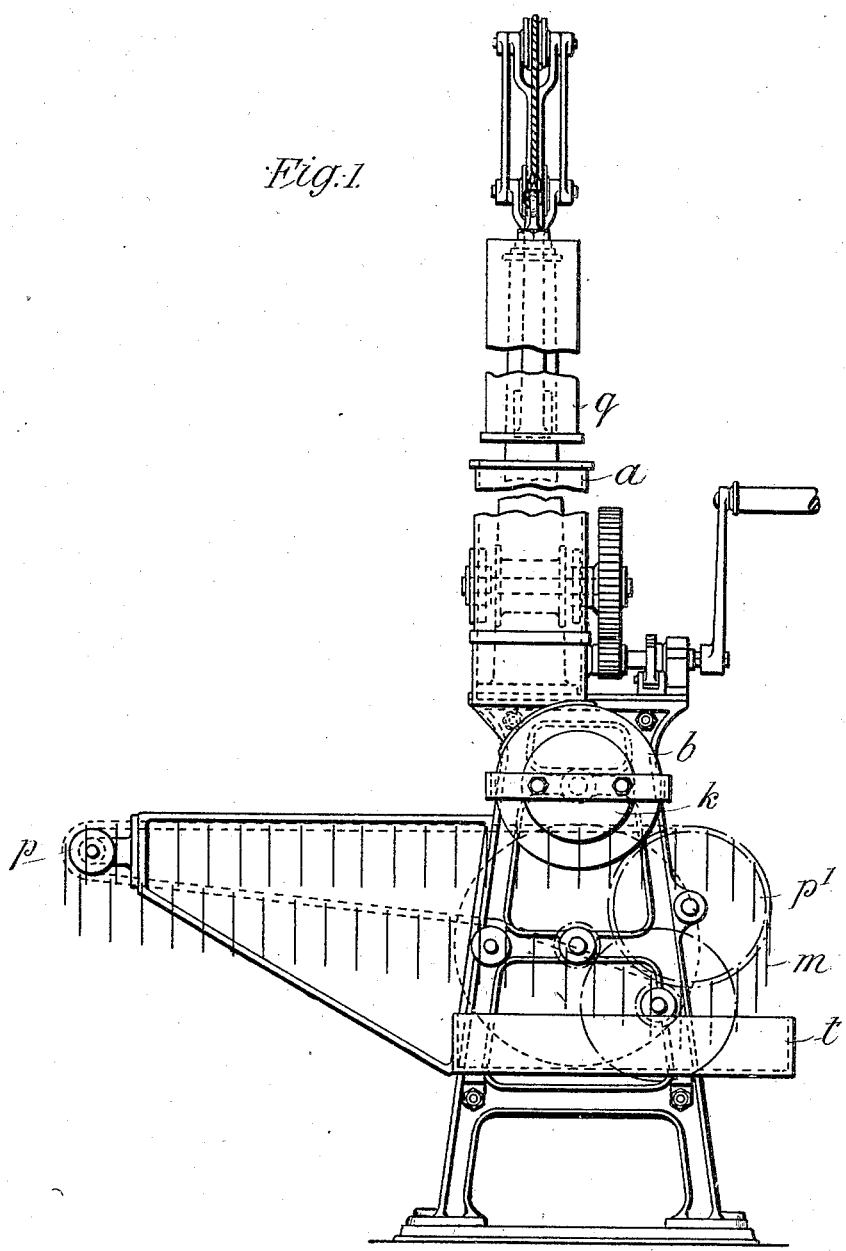
Figure 2:
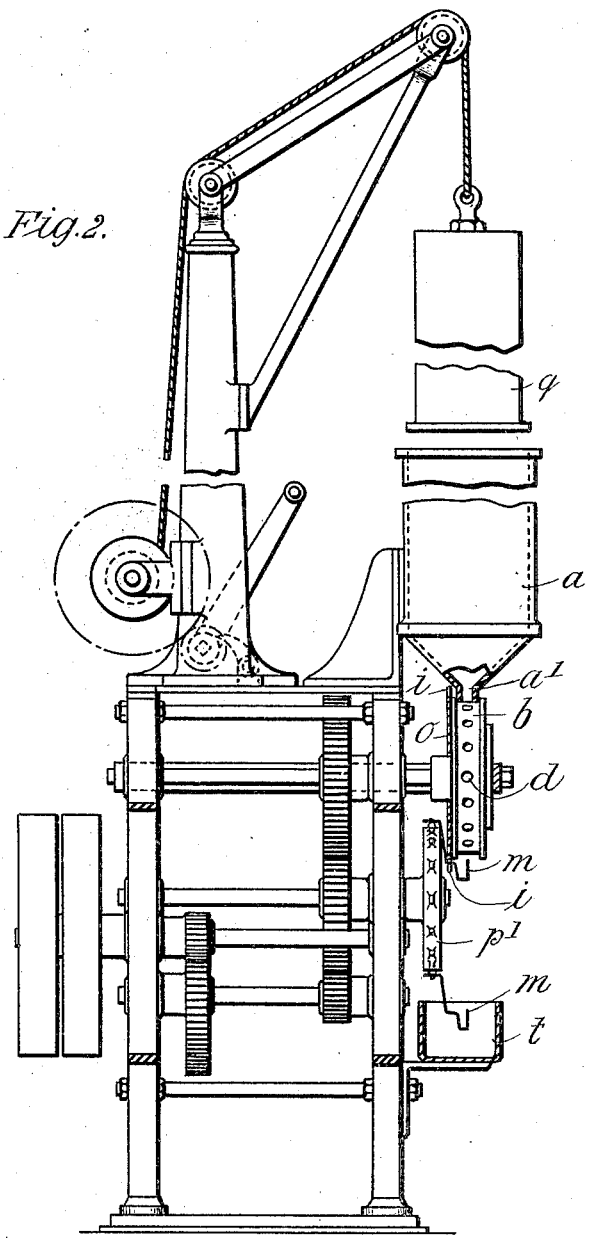

In Figure 1 of the drawings a front view is shown of a core-molding machine in combination with a steeping device, Fig. 2 being a side view of the same. Figs. 3 and 4 are longitudinal and transverse sections, respectively, of the molding and dipping devices on a larger scale.

In the present form of the invention the dipping device is shown applied to a core-molding machine in which the sugar-almond or nut-paste is contained in a receptacle $a$, the opening $a'$ in the bottom of which is closed by a rotary disk $b$; the periphery of the latter being furnished with recesses $d$ at uniform distances apart, into which when the disk rotates the material forming the core is pressed by a weight $q$, which bears thereon.

In the molds $d$ radially-arranged ejectors $g$ are moved, which on their ends turned toward the center of the disk carry pins $s$, on which are rollers $r$, by the help of which they are guided in a cam-path $h$, formed in a fixed disk $k$. (See Figs. 3 and 4.)

The cam-path $h$ is so formed that by means thereof the ejectors $g$ are alternately drawn back into the molds $d$ and moved outward in the direction of the periphery of the disk, the ejectors on approaching the opening $a'$ in the bottom of the feed-receptacle $a$ being moved back into the molds and after the molds have been filled remain stationary until the molds come nearly to their lowest position, whereupon the ejectors are pushed outward by the cam $h$, and thereby the finished cores are ejected.

The ejected cores are received by hooks $m$, which hang perpendicularly from an endless chain $n$, carried on the wheels $p$ $p'$ and moving forward at the same rate of speed as the molding-disk $b$, so that when a form reaches its lowest position a hook $m$ is below it to receive the ejected core.

Beneath the chain-wheel $p'$ is a trough arranged at such a height that the hooks $m$ dip into it, and thereby the cores carried by them are covered with chocolate which is contained in the trough.

After the dipping has been effected the finished pralines are removed from the hooks by hand or by means of suitable rake-like implements.

For precisely guiding the hooks $m$, suspended freely from the chain $n$, a disk $o$ may be arranged behind the molding-disk $b$. The disk $o$ is indented at regular intervals, and in these indentations $i$ the hooks $m$ approaching the ejecting-spot are received, so that they are kept quite concentric to the form, which is at the time in the lowest position.

What I claim, and desire to secure by Letters Patent, is—

1. A machine for molding and covering cores, consisting in the combination with a molding apparatus comprising a mold-disk, having mold-recesses in its periphery, a feed-receptacle opening onto the periphery of the mold-disk, and radial ejectors working in the mold-recesses and adapted to eject the molded cores at a predetermined point in the disk's rotation, of a dipping-trough and a conveying device comprising an endless carrier, and hooks pivotally suspended from the carrier and adapted to receive the molded cores as they are thrust out of the molds and convey them through the dipping-trough, substantially as described.

2. A machine for molding and covering cores, consisting in the combination with a molding apparatus comprising a mold-disk, having mold-recesses in its periphery, a feed-receptacle opening onto the periphery of the mold-disk, and radial ejectors working in the mold-recesses and adapted to eject the molded cores at a predetermined point in the disk's rotation, of a dipping-trough and conveying device comprising an endless carrier, hooks pivotally suspended from the carrier and adapted to receive the molded cores as they are thrust out of the molds and convey them through the dipping-trough, and a notched guide-disk mounted on the mold-disk and arranged to guide the hooks when engaging the molded cores, substantially as described.

In testimony whereof I have affixed my signature in presence of two witnesses.

PAUL ROBERT FRANKE.

Witnesses:
HERM. SACKS,
RUDOLPH FRICKE.